US007197892B2

(12) United States Patent
Ioi et al.

(10) Patent No.: US 7,197,892 B2
(45) Date of Patent: Apr. 3, 2007

(54) ENCAPSULATED ELECTRICALLY DRIVEN COMPRESSOR

(75) Inventors: Nobuyasu Ioi, Motosu-gun (JP); Naoji Konaga, Okazaki (JP)

(73) Assignee: Denso Corporation, Kariya (JP)

( * ) Notice: Subject to any disclaimer, the term of this patent is extended or adjusted under 35 U.S.C. 154(b) by 431 days.

(21) Appl. No.: 10/862,347

(22) Filed: Jun. 8, 2004

(65) Prior Publication Data

US 2004/0253124 A1 Dec. 16, 2004

(30) Foreign Application Priority Data

Jun. 11, 2003 (JP) ............................ 2003-166984

(51) Int. Cl.
*F25B 39/04* (2006.01)
*F04B 17/00* (2006.01)
*H02K 5/10* (2006.01)
*H01R 13/52* (2006.01)

(52) U.S. Cl. .................. 62/508; 417/410.3; 417/410.5; 310/85; 310/88; 439/610; 439/275; 439/279

(58) Field of Classification Search .................. 62/508; 417/410.1, 410.3, 410.5; 310/88, 85; 439/610, 439/274, 275, 279, 655, 600, 559, 469, 598, 439/587, 693

See application file for complete search history.

(56) References Cited

U.S. PATENT DOCUMENTS 5,580,282 A * 12/1996 Paterek ....................... 439/685
6,273,754 B1 * 8/2001 Bunch et al. ............... 439/587
6,372,993 B1 * 4/2002 Eckels et al. ........ 174/152 GM

FOREIGN PATENT DOCUMENTS

JP A-10-318173 12/1998

* cited by examiner

*Primary Examiner*—Chen Wen Jiang
(74) *Attorney, Agent, or Firm*—Posz Law Group, PLC

(57) ABSTRACT

The invention relates to an encapsulated electrically driven compressor for a motor vehicle and has an object to prevent electrical parts for connecting an electric motor housed in a hermetically sealed housing to an outside electric control circuit from being easily contacted with liquid-phase refrigerant, which has a higher electrical conductive property than gas-phase refrigerant. According to one of features of the present invention, an encapsulated electrically driven compressor comprises a hermetically sealed housing, a compressor device for compressing refrigerant of a refrigerating cycle, an electric motor for driving the compressor device, and a connecting device having a terminal casing for covering electrical conductive terminal portions which connect the electric motor with an outside electric control circuit, wherein the compressor device, the electric motor and the connecting device are encapsulated in the hermetically sealed housing. The terminal casing is air-tightly fixed to a side wall of the housing and a small opening is formed in the terminal casing at a position which is lower than a position of the electrical conductive terminal portions by a predetermined distance (in a downward direction towards an inside space of the hermetically sealed housing).

18 Claims, 9 Drawing Sheets

ENCAPSULATED ELECTRICALLY DRIVEN COMPRESSOR

CROSS REFERENCE TO RELATED APPLICATION

This application is based on Japanese Patent Application No. 2003-166984 filed on Jun. 11, 2003, the disclosures of which is incorporated herein by reference.

FIELD OF THE INVENTION

The present invention relates to an electrically driven compressor to be used for a motor vehicle, in particular an encapsulated electrically driven compressor for a refrigerating cycle for an automotive air conditioner.

BACKGROUND OF THE INVENTION

An electrically driven compressor is known in the prior art, which compresses refrigerant circulating in a refrigerating cycle for an automotive air conditioner.

The electrically driven compressor comprises a compressor device for compressing refrigerant and an electric motor for driving the compressor device, both of which are encapsulated in a hermetically sealed housing.

It is so arranged in many cases that the refrigerant flows into the hermetically sealed housing to cool down the electric motor, which is rotated for driving the compressor device.

The refrigerant flowing into the housing is gas-phase refrigerant from an evaporator located at an upstream side of the refrigerating cycle.

It may, however, happen that the gas-phase refrigerant in a refrigerating cycle, in particular in a hermetically sealed housing will be condensed and changed to the liquid-phase refrigerant, for example at a cold ambient temperature in winter.

The gas-phase refrigerant has generally a higher electric resistance and therefore a lower conductive property, whereas the liquid-phase refrigerant has a lower electric resistance and therefore a higher conductive property.

In many cases, the electrically driven compressor is mounted in an automotive engine room at such a place which is lower in a vertical direction than other components constituting the refrigerating cycle. The liquid-phase refrigerant condensed in the refrigerating cycle likely flows into the hermetically sealed housing for the compressor, and thereby the liquid level of the refrigerant in the compressor may be easily increased.

Accordingly, various countermeasures are taken to prevent electrically conductive parts in the hermetically sealed housing from being contacted with the liquid-phase refrigerant.

An encapsulated electrically driven compressor is known as one of those countermeasures, in which the electrically conductive parts are arranged at an upper portion of the hermetically sealed housing, because the liquid-phase refrigerant is stored by gravitation in a lower (bottom) portion of the housing.

As another countermeasure, an encapsulated electrically driven compressor is also known, in which water proofing property of the electrically conductive parts is enhanced by completely molding those parts.

It would become, however, more difficult to meet a recent requirement of a smaller size, in the case that the electrically conductive parts are arranged at upper portions of the hermetically sealed housing to prevent them from being contacted with the liquid-phase refrigerant stored in the bottom portion of the housing.

It is further disadvantageous in that the molding method for the electrically conductive parts by resin would require a longer working hour, because the molding should be done after the electrically conductive parts are assembled into the hermetically sealed housing.

SUMMARY OF THE INVENTION

It is, therefore, an object of the present invention, in view of the above mentioned problems, to provide an encapsulated electrically driven compressor, which is simple in construction to prevent the electrically conductive parts from being contacted with the liquid-phase refrigerant and thereby to prevent the compressor from stopping its operation due to short circuit. In particular, when the liquid-phase refrigerant flows into the compressor from other components of the refrigerating cycle and the liquid-level of the refrigerant in the compressor housing is increased at a low temperature during the winter, the present invention can prevent possible contact between the electrically conductive parts and the liquid-phase refrigerant by a simpler structure of the compressor, in particular of a portion of the compressor connecting an electric motor to an outside electric control device.

According to one of features of the present invention, an encapsulated electrically driven compressor comprises a hermetically sealed housing, a compressor device for compressing refrigerant of a refrigerating cycle, an electric motor for driving the compressor device, and a connecting device having a terminal casing for covering electrical conductive terminal portions which connect the electric motor with an outside electric control circuit, wherein the compressor device, the electric motor and the connecting device are encapsulated in the hermetically sealed housing. The terminal casing is air-tightly fixed to a side wall of the housing and an opening having a small opening aperture is formed in the terminal casing at a position which is lower than a position of the electrical conductive terminal portions by a predetermined distance (in a vertically downward direction towards an inside space of the hermetically sealed housing).

According to the above feature, when refrigerant in the refrigerating cycle (including the hermetically sealed housing) is condensed and changed from a gas-phase to a liquid-phase refrigerant, the liquid-phase refrigerant flows into the hermetically sealed housing and is stored at a bottom portion of the housing. And even when a liquid level of the refrigerant in the housing reaches the terminal casing, the liquid-phase refrigerant would not at once flow into an inside space defined by the terminal casing due to a gas pressure of the refrigerant held in the inside of the space. The gas-phase refrigerant, however, will be gradually changed into the liquid-phase refrigerant as the time goes by. And therefore, it is preferable to make an opening dimension of the small opening formed at the terminal casing less than a predetermined value, so that a speed of increase of the liquid level in the inside space of the terminal casing can be made lower than that in the inside space of the hermetically sealed housing.

As above, it is prevented by a simple structure that the liquid level of the refrigerant would reach the electrically conductive terminal portions within a shorter period of time and thereby the electrically conductive terminal portions would be contacted with the liquid-phase refrigerant, in particular in winter nights during which the ambient temperature would become low.

As a result, it becomes possible to prevent a stop of operation of the electrically driven compressor due to a short circuit.

The opening dimension of the opening formed at the terminal casing will be preferably calculated based on a formula in proportion to a volume of the inside space defined by the terminal casing, wherein the opening dimension is from 0.05 $mm^2$ to 0.15 $mm^2$ for each 1 $cm^3$. According to the opening having the above dimension, the liquid-phase refrigerant is prevented from easily flowing into the inside of the terminal casing.

According to another feature of the present invention, the opening is formed at a side surface of the terminal casing so that it is directed in a horizontal direction, and also formed at a position which is lower than the position of the electrical conductive terminal portions in a vertical downward direction.

The electrical conductive terminal portions are such portions at which and through which the electric motor is connected to the outside electric control circuit (electric power supply circuit), and therefore, the electric power from the control circuit is transmitted through the electrical conductive terminal portions to lead wires extending from the electric motor.

The electrical conductive terminal portions are arranged at an upper portion of the electric motor in most cases. When any tension is applied to the lead wires in the vertical downward direction, it may happen that the lead wires are drawn out from the electrical conductive terminal portions, resulting in an electrical disconnection.

According to the above mentioned other feature of the present invention, however, the lead wires extending from the electric motor are inserted into and tightly held by the electrical conductive terminal portions, since the lead wires are bent by almost 90 degrees in the terminal casing and close to the terminal portions. And thereby, the electrical connection of the lead wires to the electrical conductive terminal portions is firmly kept, even if any tension in the downward direction is applied to the lead wires.

According to a further feature of the present invention, the terminal casing is fixed to the side wall of the hermetically sealed housing, and the terminal casing is air-tightly and firmly held in its position by pressing force in the vertical direction. And therefore, the terminal casing can be fixed to the housing in a simpler manner.

According to a further feature of the present invention, an elastic element, such as rubber, is interposed between the upper surface of the terminal casing and the inner surface of an accommodation hole formed in side wall of the housing, in which the terminal casing is inserted and firmly held. The hermetically sealed housing is generally made of metal, while the terminal casing is made of resin. Air-tightness between the housing and the terminal casing is not sufficiently high, even when the terminal casing is press contacted to the housing.

According to the feature of the invention, however, high air-tightness between the housing and the terminal casing can be obtained because of the elastic element. And even when the liquid-phase refrigerant reaches to the upper surface of the terminal casing through a gap between an outer side surface of the terminal casing and the inner side of the housing, it is prevented that the liquid-phase refrigerant flows into the inside of the terminal casing (namely to the electrical conductive terminal portions).

According to a still further feature of the present invention, the terminal casing is firmly and tightly held in the accommodation hole by a lock mechanism, in which the terminal casing is held in a position in a horizontal direction. According to this feature, it is not necessary to provide a step portion at which a lower end of the terminal casing will be seated to firmly hold the same in a vertical direction. And therefore, the terminal casing can be fixed to and held by the housing in a simpler manner.

According to a further feature of the invention, O-rings are provided on pins, through which the electrical conductive terminal portions are electrically connected to the outside electric control circuit, and interposed between the terminal casing and the elastic element. And thereby, the air-tightness of the terminal casing can be further improved and the short circuit of the terminal portions can be prevented even when the liquid-phase refrigerant reaches the upper surface of the terminal casing from the outside thereof.

According to a further feature of the present invention, the surface roughness (Rz) of the upper surface of the terminal casing is made less than 25 z in term of the ten-point mean roughness and the surface flatness thereof is made less than 0.2 mm. According to this feature, the air-tightness between the upper surface of the terminal casing and the elastic element can be further improved.

According to a further feature of the present invention, a circular projection is formed on the upper surface of the terminal casing. Accordingly, even when the liquid-phase refrigerant reaches the upper surface of the terminal casing from the outside thereof, it can be prevented that the liquid-phase refrigerant flows into the inside of the terminal casing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

A first embodiment of the present invention will now be explained with reference to FIG. 1, which shows a schematic view of an encapsulated electrically driven compressor 100.

Figure 1:
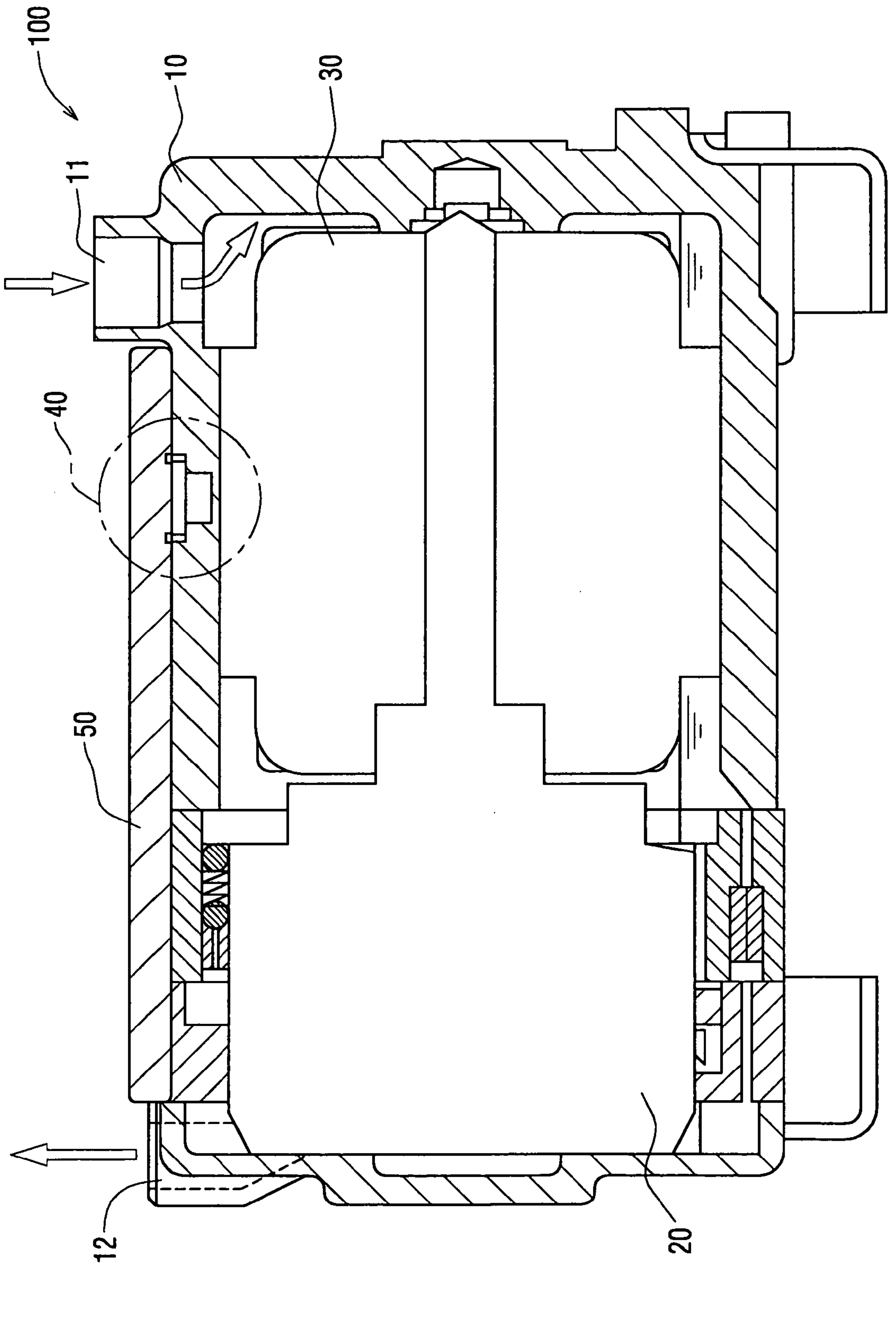
FIG. 1 is a cross-sectional view schematically showing an encapsulated electrically driven compressor according to the present invention.

In FIG. 1, a numeral 10 designates a hermetically sealed housing of the encapsulated electrically driven compressor 100, in which an inlet port 11 through which refrigerant flows into the housing and an outlet port 12 through which pressurized refrigerant will be pumped out are formed.

In the hermetically sealed housing 10, there are housed a compressor device 20 which compresses refrigerant introduced from the inlet port 11 and pumps out the pressurized refrigerant through the outlet port 12, an electric motor 30 which generates and transmits rotational driving force to the compressor device 20 for compressing the refrigerant, and a terminal connecting device 40 for electrically connecting the electric motor 30 to an inverter device 50 which is arranged at an outer side of the hermetically sealed housing 10 (in most cases, at the upper portion of the housing).

The inverter device 50 supplies rectified electric power to the electric motor 30 through the connecting device 40. The encapsulated electrically driven compressor 100 is constituted mainly by the above hermetically sealed housing 10, the compressor device 20, the electric motor 30, the connecting device 40 and the inverter device 50.

Figure 2:
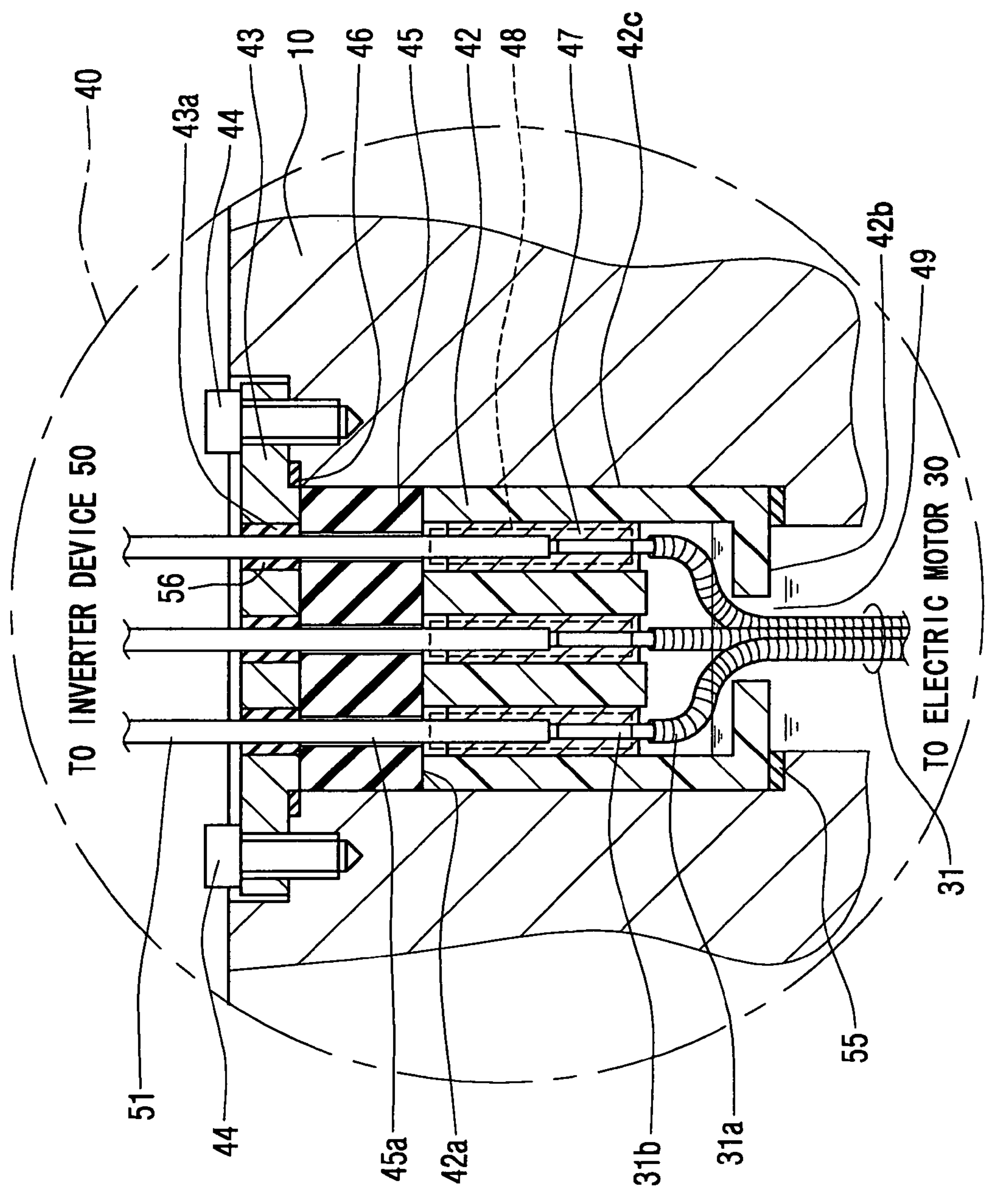
FIG. 2 is an enlarged cross-sectional view showing a connecting device of the compressor shown in FIG. 1.

FIG. 2 shows a detailed construction of the connecting device 40.

The connecting device 40 shown in FIG. 2, comprises a terminal casing 42 made of resin covering electrical conductive terminal portions 48, a base housing 43 for fixing the terminal casing 42, bolts 44 for fixing the base housing 43 to the hermetically sealed housing 10, a block rubber 45 made of elastic material and disposed between the terminal casing 42 and the base housing 43 for enhancing a sealing property at an upper side of the terminal casing 42, a gasket 46 disposed between the base housing 43 and the block rubber 45 for increasing a sealing effect therebetween, and socket terminals 47 electrically connecting lead wires 31 extending from the electric motor 30 to the connecting device 40 with pins 51 extending from the inverter device 50 to the connecting device 40. As understood from FIG. 2, the base housing 43 constitutes a part of the hermetically sealed housing 10, when it is screwed to the housing 10 by the bolts 44.

The lead wires 31 comprise film cover portions 31*a* and lead metal portions 31*b*, so that the lead metal portions 31*b* are inserted into the socket terminals 47 to be electrically connected with the pins 51 after the film cover portions 31*a* are stripped out.

The electrical conductive terminal portions 48 mean such portions at which the pins 51 and the lead metal portions 31*b* are inserted into the socket terminals 47 and those parts are electrically connected with each other. The terminal casing 42 is formed to cover the conductive terminal portions 48 so that it prevents the conductive terminal portions 48 from the short circuit due to influent refrigerant or the like. In the base housing 43 and the block rubber 45, through-holes 43*a* and 45*a* are respectively formed, so that the pins 51 are inserted into and through those through-holes. Numeral 56 designates bushes made of resin or rubber for air-tightly holding the pins.

Figure 3:
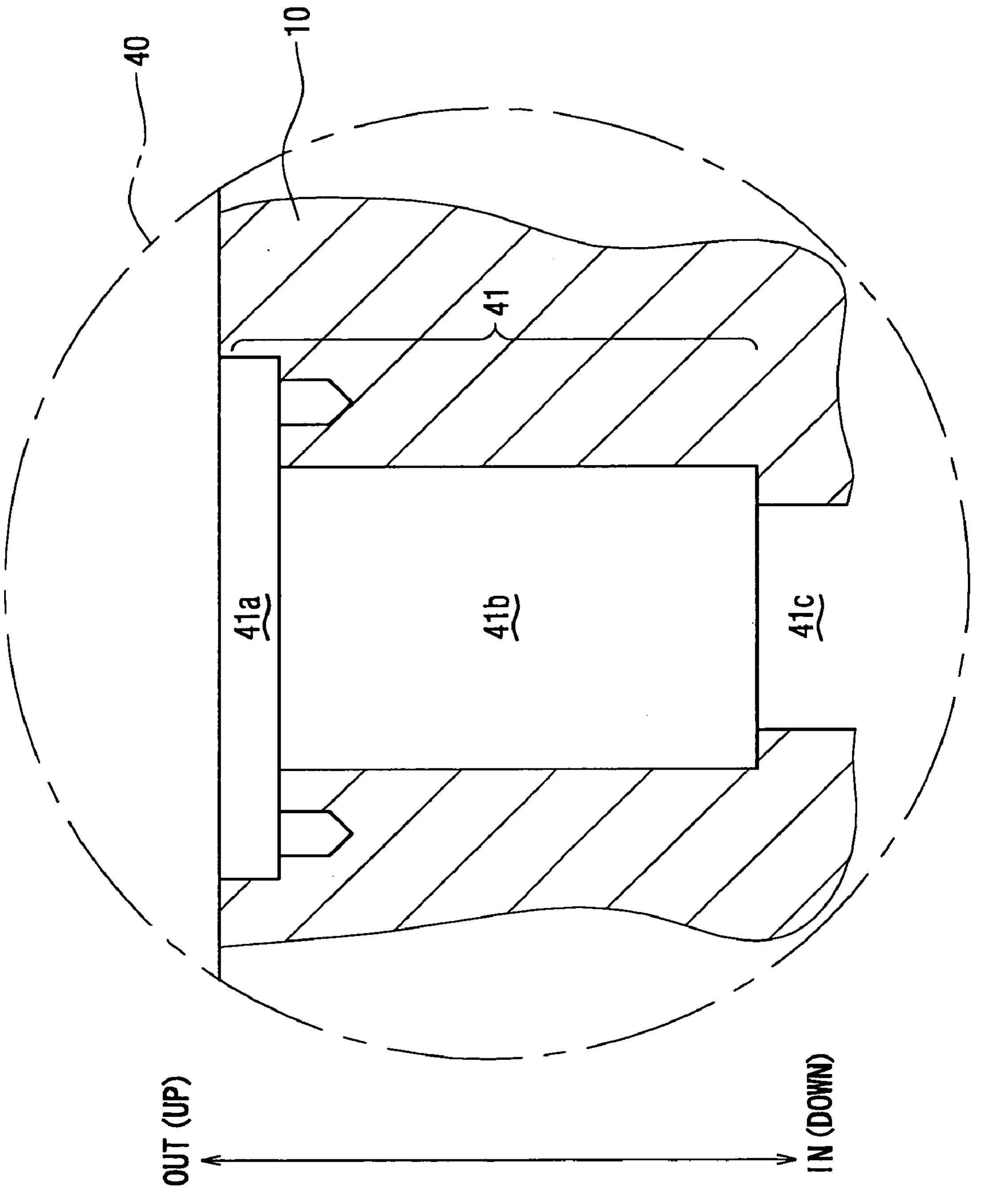
FIG. 3 is an enlarged cross-sectional view showing an accommodation hole of a housing of the compressor shown in FIG. 1.

An accommodating hole 41 is formed in the housing 10, which accommodates therein the terminal casing 42, the base housing 43, the bolts 44, the block rubber 45 and the gasket 46, as shown in FIG. 3.

The accommodating hole 41 has three step inner diameters which will become smaller in a direction from the outside towards the inside of the housing 10. The outermost hole 41*a* has the largest inner diameter for accommodating the base housing 43.

An intermediate hole 41*b* has a smaller inner diameter than that of the outermost hole 41*a* for accommodating the block rubber 45 and the terminal casing 42.

An innermost hole 41*c* has a further smaller inner diameter than that of the intermediate hole 41*b* for accommodating the lead wires 31.

Since the innermost hole 41*c* has a smaller inner diameter than that of the intermediate hole 41*b*, there is formed a shoulder portion 41*d* between the holes 41*b* and 41*c*, so that the terminal casing 42 and the block rubber 45 are prevented from being further pushed down towards the inside of the housing 10.

In FIG. 2, a through-hole 49 (opening) is formed at a lower end 42*b* of the terminal casing 42, so that the lead wires 31 pass through the through-hole (opening) 49 and an inside space defined by the terminal casing 42 is communicated with an inside of the housing 10 through the opening 49.

Numeral 55 designates a seal ring made of rubber disposed between the lower end 42*b* of the terminal casing 42 and the shoulder portion 41*d*, so that the liquid-phase refrigerant may not flows into a space or gap between the outer side surface of the terminal casing 42 and the inner surface of the intermediate hole 41*b*.

The inside space defined by the terminal casing 42 is not hermetically sealed from the inside space of the housing 10 by inserting the lead wires 31 through the opening 49. The opening 49 has a remaining opening area (for example 2 $mm^2$) after the lead wires have been inserted, so that it can keep a pressure of the refrigerant in the inside space defined by the terminal casing 42 equal to a pressure of the refrigerant in the inside space of the housing 10.

The opening dimension of the opening 49, more exactly the remaining opening area after the lead wires 31 are inserted into the opening 49, is preferably calculated based on a formula in proportion to a volume of the inside space defined by the terminal casing 42, wherein the opening dimension is from 0.05 $mm^2$ to 0.15 $mm^2$ for each 1 $cm^3$. According to the embodiment, since the volume of the inside space of the terminal casing 42 is 17.15 $cm^3$ (14 mm×35 mm×35 mm), the preferable opening dimension is between 0.85 $mm^2$ and 2.57 $mm^2$.

Air tightness of the inside space of the terminal casing 42 is obtained by a press contact between an upper surface 42*a* and the block rubber 45. It is preferable that surface roughness (Rz) is less than 25 z in terms of measurement method of ten-point mean roughness (according to a measurement method of JIS B 0601 (1994) and JIS B 0031 (1994)) and surface flatness is less than 0.2 mm.

It has become possible to obtain the press contact for keeping the high air tightness between the upper surface 42*a* of the terminal casing 42 and the block rubber 45 with the above mentioned surface roughness and flatness.

In the above described encapsulated electrically driven compressor 100 having the terminal connecting device 40, when the ambient temperature becomes lower, the refrigerant in the components constituting the refrigerating cycle will be condensed and partly changed from the gas-phase to the liquid-phase refrigerant and the liquid-phase refrigerant may flow into the housing 10 and stored at a bottom portion thereof. And as the case may be, the liquid level of the refrigerant may reach at the terminal connecting device 40. The liquid-phase refrigerant, however, would not at once flow into the space defined by the terminal casing 42, or liquid level of the refrigerant would not reach the conductive terminal portions 48 within a shorter period of time even if the liquid-phase refrigerant would flow into the space defined by the terminal casing 42, because the upper surface 42*a* of the terminal casing 42 is air-tightly sealed by the block rubber 45, the gasket 46 and the base housing 43.

As above, since there is provided in the terminal casing 42 with no other holes than the opening 49, through which gas may be let out, the liquid-phase refrigerant may not at once flow into the inside space defined by the terminal casing 42 due to pressure of gas-phase refrigerant caged in the inside space.

Furthermore, even when the liquid-phase refrigerant would flow into the inside space defined by the terminal casing 42 because of a higher pressure of the liquid-phase refrigerant than that of the gas-phase refrigerant in the inside space, the liquid level of the refrigerant may not at once reach to a point where the liquid-phase refrigerant will contact with the conductive terminal portions 48 since it takes a longer period of time until a major portion or all of the gas-phase refrigerant in the inside space would be finally changed into the liquid-phase refrigerant.

Accordingly, the conductive terminal portions 48 are preferably arranged at such a point higher than an anticipated point, at which the pressure of the gas-phase refrigerant in the space defined by the terminal casing 42 and the pressure of the liquid-phase refrigerant flowing into the space would be balanced at an initial stage of the liquid-phase refrigerant flowing into the space. In other words, it has become possible to prevent the conductive terminal portions 48 from being contacted with the liquid-phase refrigerant and thereby the short circuit of the encapsulated electrically driven compressor 100, by forming the opening 49 at a position which is lower than the conductive terminal portions 48 by a predetermined distance, even when the liquid-phase high pressure refrigerant comes closer to the terminal casing 42.

(Second Embodiment)

In the above first embodiment, the lead wires 31 are straightly extending from the electric motor 30 to the connecting device 40 in a vertical direction.

When any tension is applied to the lead wires 31 in a downward direction, the tension will directly act on the socket terminals 47. As a result, electrical disconnection between the lead metal portions 31*b* and the pins 51 may happen because of this tension applied to the socket terminals 47.

Figure 4:
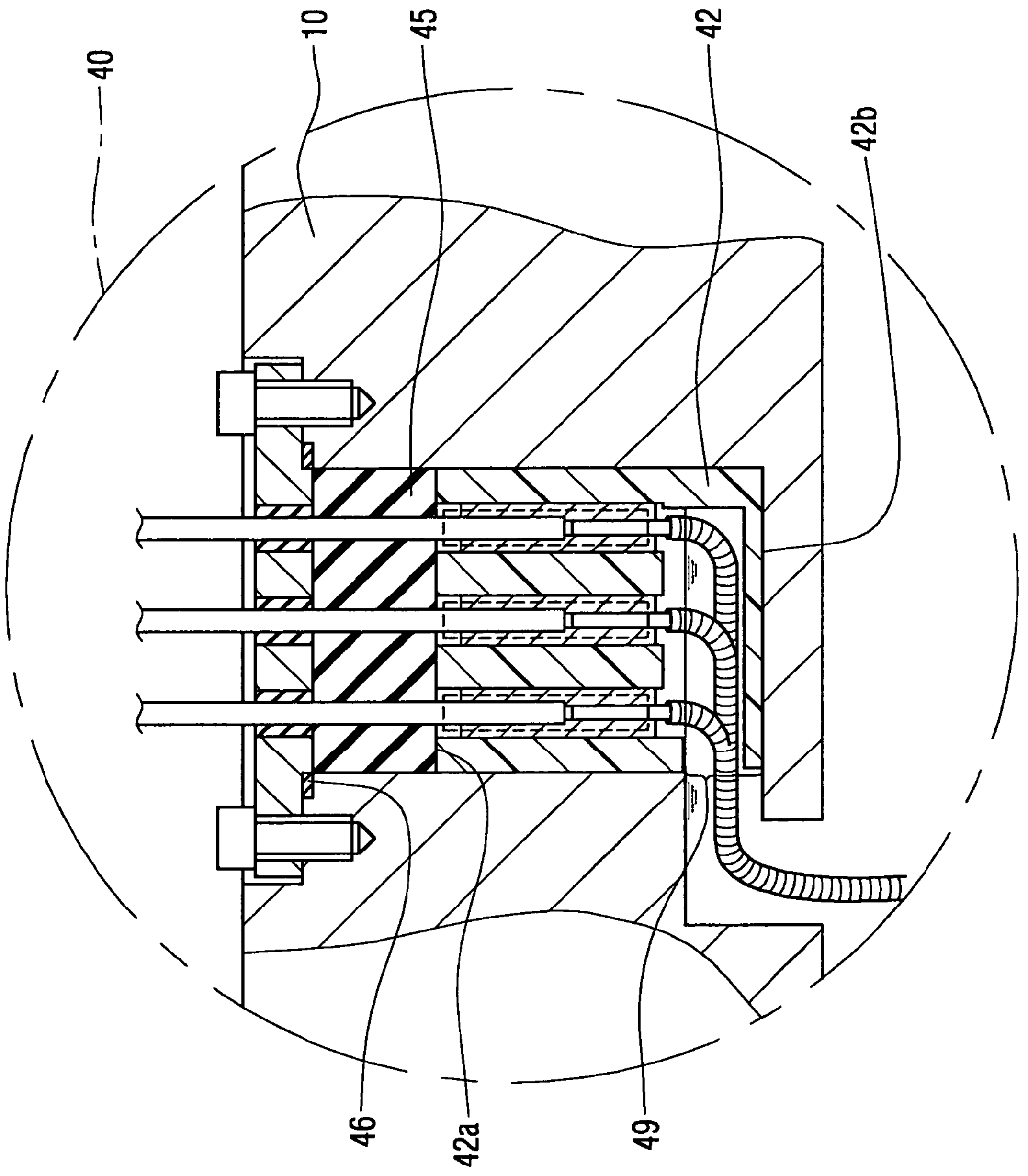
FIG. 4 is an enlarged cross-sectional view showing a connecting device according to the second embodiment.

To this end, the opening (through-hole) 49, one end of which opens to the inside space of the housing 10 not in a vertical but in a horizontal direction, can be formed at a side portion 42*c* of the terminal casing 42, as shown in FIG. 4.

As shown in FIG. 4, since the opening 49 is formed at the side portion 42*c* of the terminal casing 42, the lead wires 31 extending to the electric motor 30 are bent by almost 90 degrees at the bottom of the terminal casing 42.

According to the above structure, the clip-insert structures of the socket terminals 47 may not be easily broken, even when the tension is applied to the lead wires 31 in the downward direction, since the lead wires 31 are bent by almost 90 degrees at positions close to the conductive terminal portions 48.

The opening 49 is formed to the side portion 42*c* of the terminal casing 42 at such a position which is lower than the conductive terminal portions 48 by a predetermined distance.

(Third Embodiment)

In the above described embodiments, the three holes 41*a*, 41*b* and 41*c* having different inner diameters are formed in the housing 10, wherein the lowermost hole 41*c* has the smallest inner diameter to keep the terminal casing 42 at its position, namely to prevent the block rubber 45 and the terminal casing 42 from falling down due to their gravities.

Accordingly, it requires longer working hour to form such three different holes having different inner diameters in the housing 10.

Figure 5:
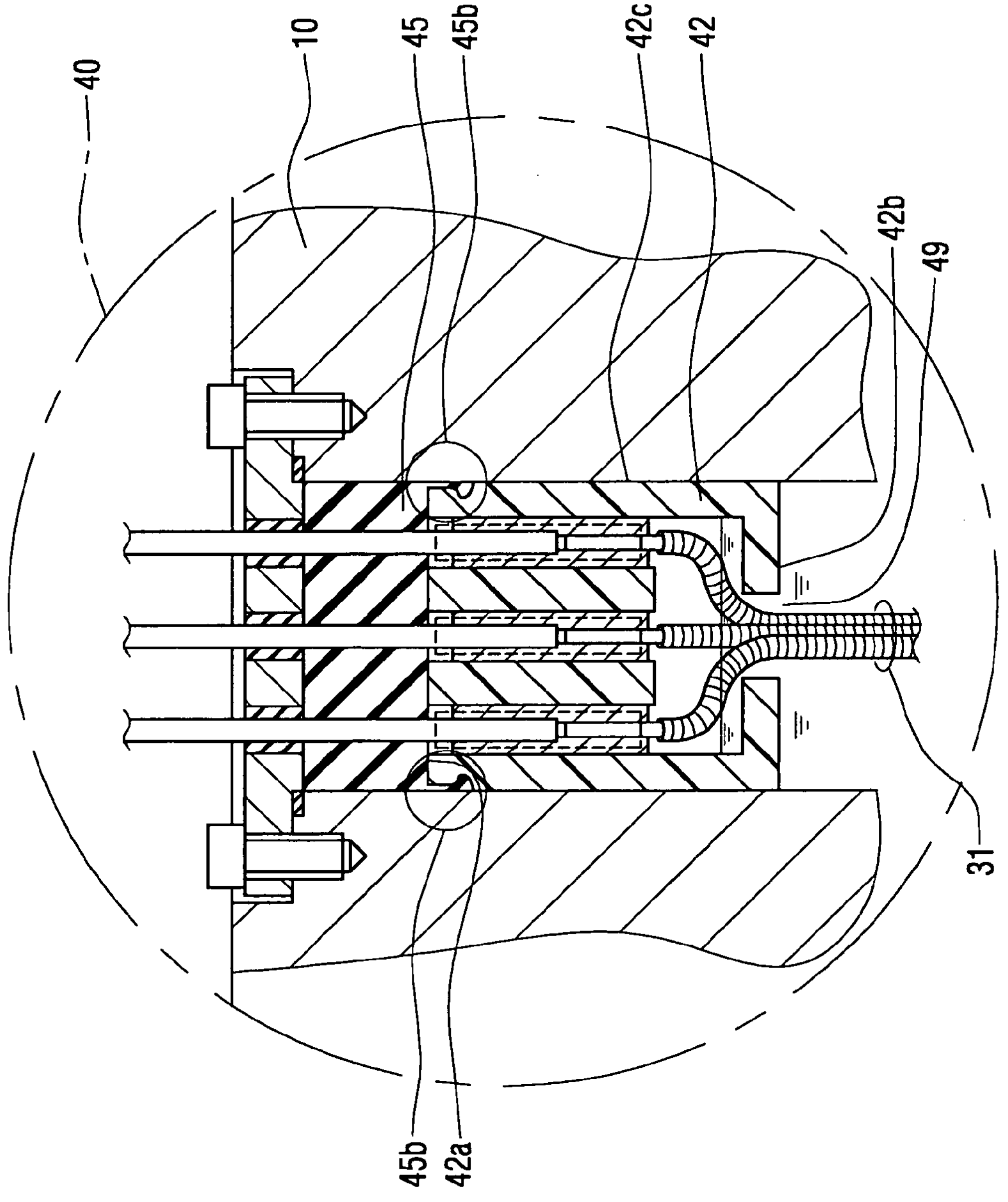
FIG. 5 is an enlarged cross-sectional view showing a connecting device according to the third embodiment.

Then, according to the third embodiment, a lock element 45*b* is integrally formed at the lower end of the block rubber 45 instead of forming the lowermost hole 41*c*, as shown in FIG. 5. The lock element 45*b* holds tightly the terminal casing 42 in a horizontal direction, to prevent the terminal casing 42 from falling down. It is also possible by this lock element 45*b* to air-tightly hold the block rubber 45 and the terminal casing 42, in addition to the prevention of the fall down of the terminal casing 42, and therefore the lowermost hole 41*c* may not be necessary to be formed in the housing 10, resulting in a simpler manufacturing process for the through-hole 41. Furthermore, the seal ring 55 is not necessary, either.

(Fourth Embodiment)

In the above explained embodiments, the upper surface 42*a* is air-tightly contacted to the block rubber 45.

Figure 6:
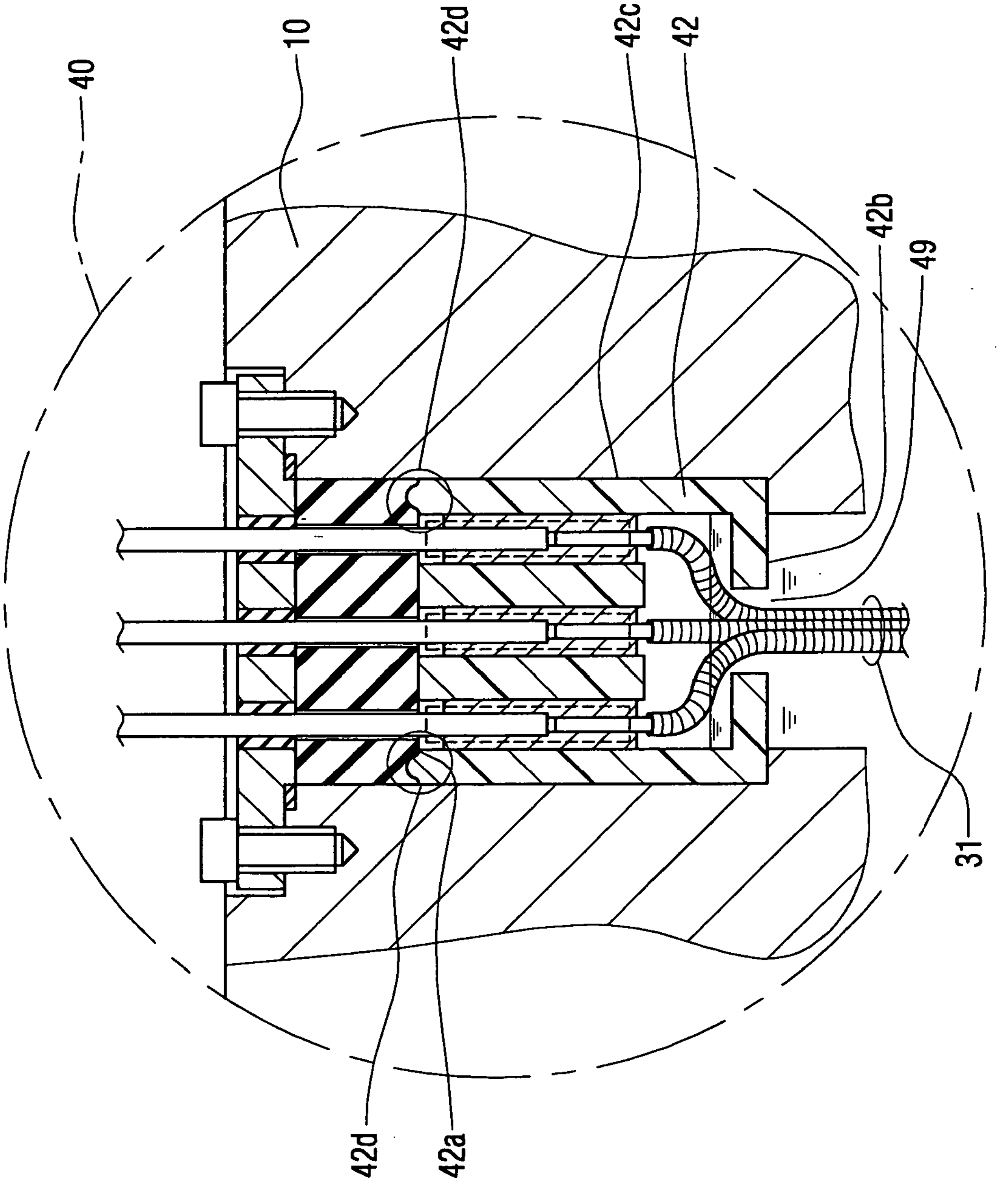
FIG. 6 is an enlarged cross-sectional view showing a connecting device according to the fourth embodiment.

In the embodiment shown in FIG. 6, a circular projection 42*d* is formed at the upper surface 42*a* of the terminal casing 42 to improve air-tightness between the terminal casing 42 and the block rubber 45, while the seal ring 55 between the lower end 42*b* and the shoulder portion 41*d* is omitted here.

FIG. 6 shows a condition in which the liquid-phase refrigerant flows into the inside space defined by the terminal casing 42. When the pressure of the liquid-phase refrigerant will be further increased, it may happen that the liquid-phase refrigerant flows upwardly along a surface (gap) between an outer side surface of the terminal casing 42 and an inner surface of the intermediate hole 41*b*.

It is, however, possible according to the present embodiment to prevent the liquid-phase refrigerant flowing into the inside space defined by the terminal casing 42 through a gap between the upper surface 42*a* and the block rubber 45 because of the circular projection 42*d*.

It is not limited to a single circular-projection 42*d*, and multiple circular projections can be formed.

(Fifth Embodiment)

Figure 7:
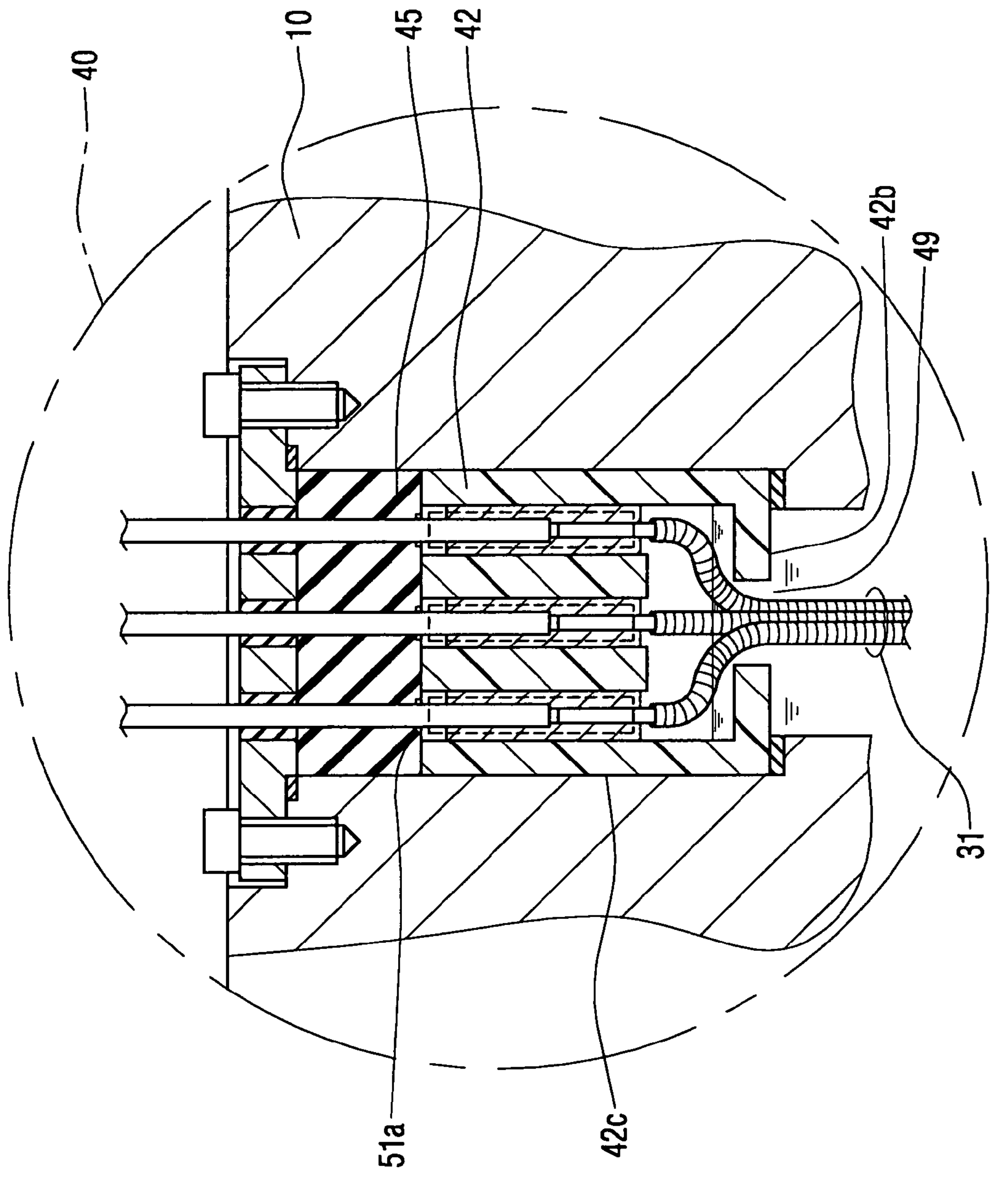
FIG. 7 is an enlarged cross-sectional view showing a connecting device according to the fifth embodiment.

O-rings 51*a* can be further used to increase the air-tightness between the upper surface 42*a* and the block rubber 45, as shown in FIG. 7. In FIG. 7, the O-rings 51*a* are provided on the pins 51 and pressed between the upper surface 42*a* and the block rubber 45.

As explained above in connection with the fourth embodiment, the liquid-phase refrigerant may happen to flow upwardly along the gap between the outer side surface 42*c* of the terminal casing 42 and the inner surface of the intermediate hole 41*b*. However, it is prevented by the O-rings 51*a* that the liquid-phase refrigerant flows into the conductive terminal portions 48, even when the liquid-phase refrigerant reaches the gap between the upper surface 42*a* and the block rubber 45.

As a result, the short circuit of the encapsulated electrically driven compressor is prevented.

(Further Modifications)

Figure 8:
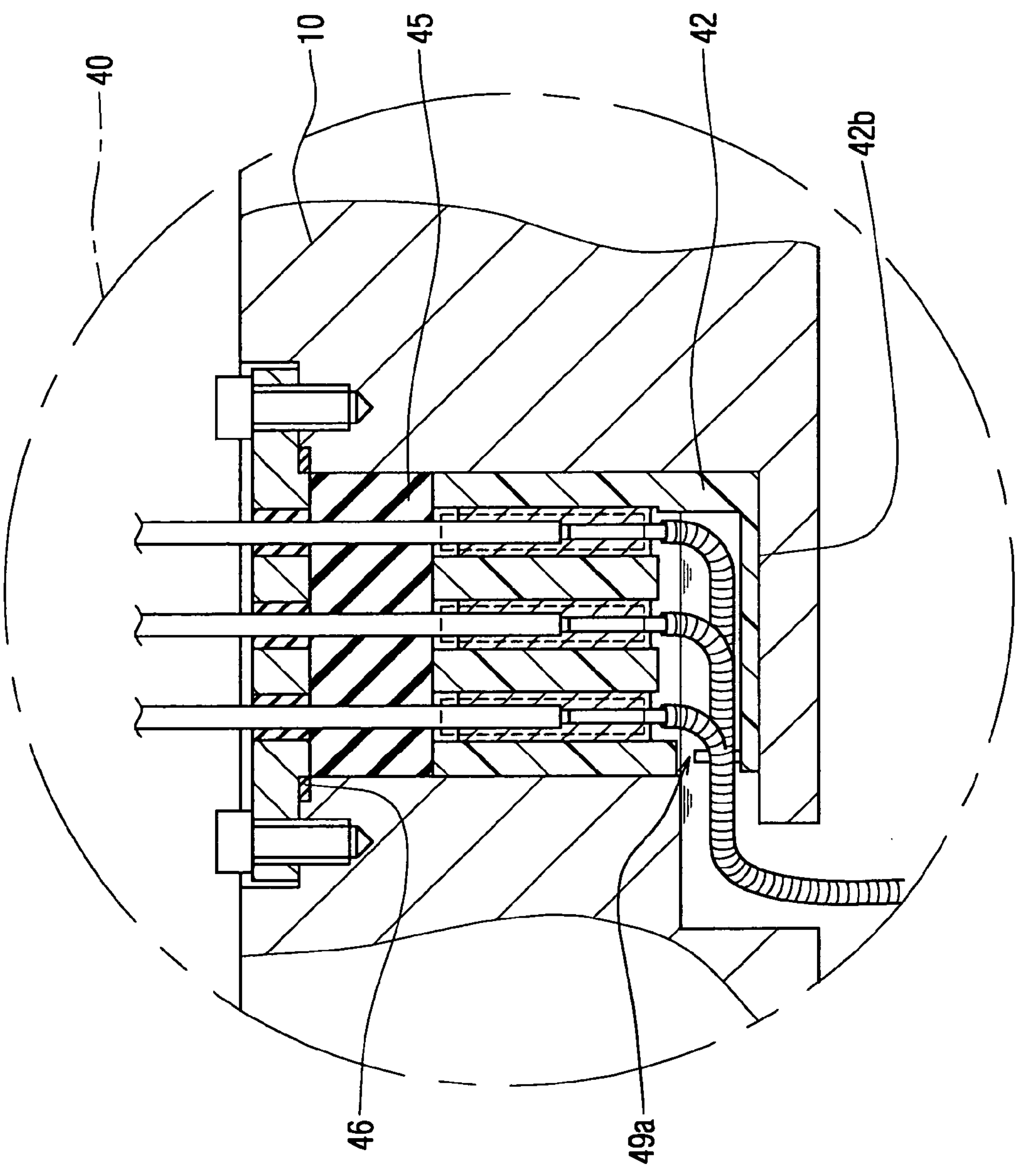
FIGS. 8 and 9 are enlarged cross-sectional views showing further modifications of the present invention.

In the above embodiments, the lead wires 31 are inserted through the opening 49 into the inside space defined by the terminal casing 42, while the opening has the remaining opening aperture through which the inside space of the terminal casing 42 is communicated with the inside space of the housing 10. It is, however, the opening 49 can be so made that the opening aperture will be closed by the insertion of the lead wires 31 and instead another opening 49*a* can be formed at the lower end or side of the terminal casing 42 so that the inside space of the terminal casing 42 is communicated with the inside space of the housing 10, wherein the other opening 49*a* has an opening dimension of 0.05 $mm^2$ to 0.15 $mm^2$ for each 1 $cm^3$, as shown in FIG. 8.

Figure 9:
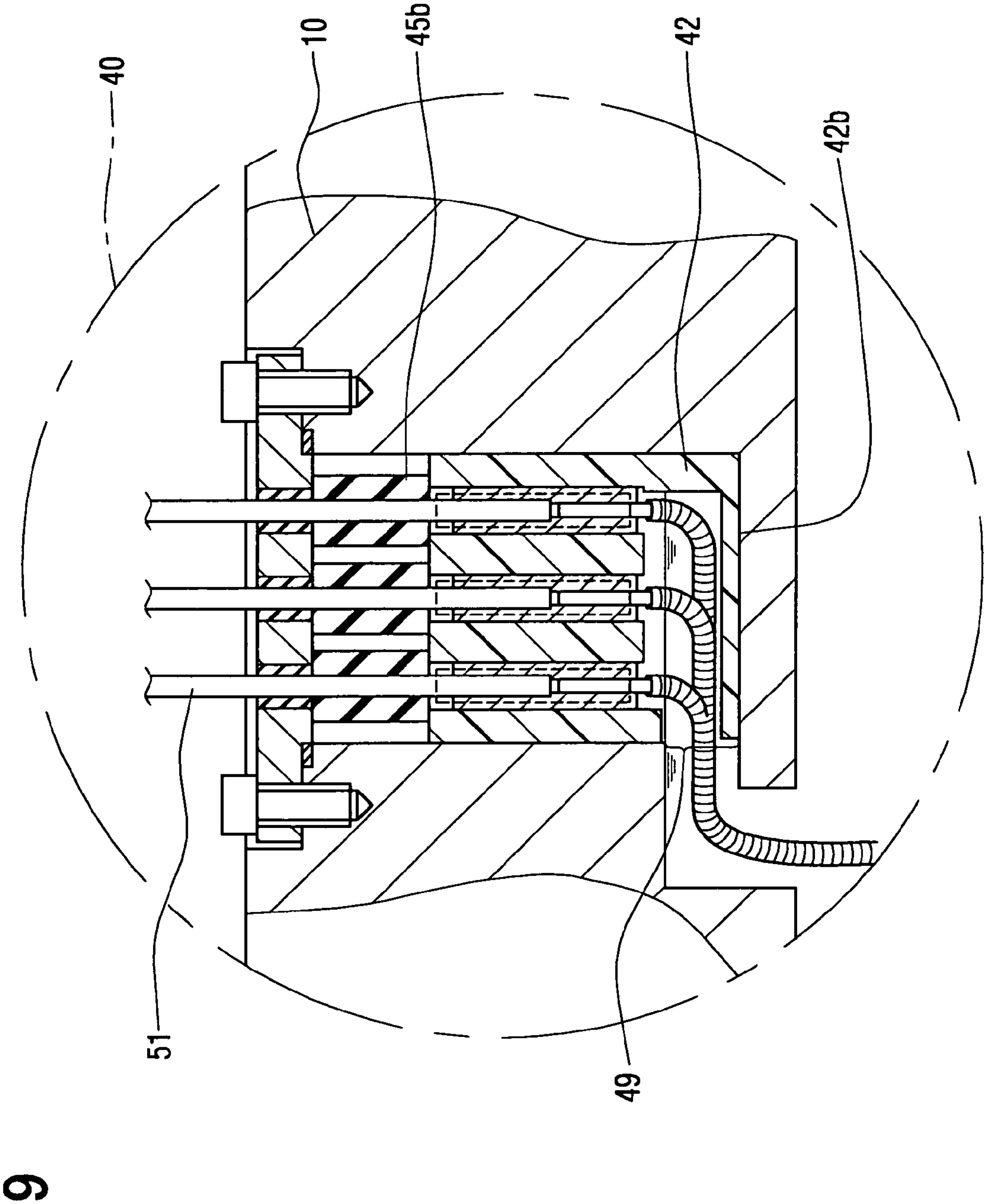

Furthermore, in the above embodiments, the single block rubber 45 is interposed between the base housing 43 and the terminal casing 42 to obtain the air-tightness, wherein three through-holes 45*a* are formed in the block rubber 45 so that pins 51 are respectively inserted therethrough. Instead of this single block rubber 45, however, three independent tubes 45*b* can be interposed between the base housing 43 and the terminal casing 42, as shown in FIG. 9, wherein the tubes 45*b* are made of elastic material (for example, HNBR) and resistive against the refrigerant and lubricating oil contained in the refrigerant.

What is claimed is:

1. An encapsulated electrically driven compressor comprising:

a hermetically sealed housing;

a compressor device (20) for compressing refrigerant for a refrigerating cycle;

an electric motor for driving the compressor device;

a connecting device having electrically conductive terminal portions electrically connecting the electric motor to an electric control device which is located outside of the housing, and also having a terminal casing made of such material which is resistive against the refrigerant and oil and covering the electrically conductive terminal portions, wherein the compressor device, the electric motor and the connecting device are housed in the hermetically sealed housing, and wherein the terminal casing is air-tightly fixed to an inner wall of the housing, an opening having a small opening aperture is formed in the terminal casing at such a position which is lower than a position of the electrically conductive terminal portions in a vertical direction and is displaced by a predetermined distance towards an inside space of the housing, the opening is communicated with the inside space of the housing, and the opening aperture has a predetermined opening dimension.

2. An encapsulated electrically driven compressor according to claim 1, wherein the opening is formed at a side portion of the terminal casing.

3. An encapsulated electrically driven compressor according to claim 1, wherein the terminal casing is inserted into an accommodation hole formed at a side wall of the housing, so that the terminal casing is tightly held in a vertical direction.

4. An encapsulated electrically driven compressor according to claim 1, wherein an elastic element is air-tightly interposed between the upper surface of the terminal casing and the inner surface of the housing.

5. An encapsulated electrically driven compressor according to claim 4, wherein the electrical conductive terminal portions have multiple conductive pins to be connected to the electric control device, the conductive pins being inserted into the electrical conductive terminal portions through the elastic element, and wherein multiple O-rings are provided on the respective conductive pins between the upper surface of the terminal casing and the elastic element.

6. An encapsulated electrically driven compressor according to claim 4, wherein the upper surface of the terminal casing has a surface roughness less than 25 z in term of the ten-point mean roughness and a surface flatness less than 0.2 mm.

7. An encapsulated electrically driven compressor according to claim 4, wherein the terminal casing has a circular projection on the upper surface thereof.

8. An encapsulated electrically driven compressor according to claim 1, wherein a lock element is integrally formed to the elastic element for firmly fixing and holding the terminal casing to the housing.

9. An encapsulated electrically driven compressor according to claim 1, wherein the opening dimension of the opening aperture is calculated based on a formula in proportion to a volume of the inside space defined by the terminal casing and selected from a range of 0.05 $mm^2$ to 0.15 $mm^2$ for each 1 $cm^3$.

10. An encapsulated electrically driven compressor according to claim 1, further comprising;

lead wires connecting the electric motor to the electrically conductive terminal portions, wherein the lead wires (31) are inserted through the opening and the inside space of the terminal casing is communicated with the inside space of the housing through a remaining area of the opening.

11. An encapsulated electrically driven compressor according to claim 1, further comprising;

lead wires connecting the electric motor to the electrically conductive terminal portions, wherein the lead wires are inserted through the opening; and another opening formed in the terminal casing through which the inside space defined by the terminal casing is communicated with the inside space of the housing.

12. An encapsulated electrically driven compressor comprising:

a hermetically sealed housing;

a compressor device incorporated into the housing for compressing refrigerant for a refrigerating cycle;

an electric motor incorporated into the housing and operatively connected to the compressor device for driving the same; and a connecting device disposed in the inside of the housing and having electrically conductive terminal portions electrically connecting the electric motor to an outside electric control device, wherein the connecting device comprises;

a terminal casing fixed to an inside wall of the housing and housing therein the electrically conductive terminal portions and defining an inside space therein, wherein the electrically conductive terminal portions comprise socket terminals, pins to be connected at their one ends to the outside electric control device, and lead wires connected at their one ends to the electric motor, the respective other ends of the pins and the lead wires being electrically connected to each other by the socket terminals, wherein the terminal casing comprises a small opening formed at its lower end, so that the inside space defined by the terminal casing is communicated with an inside space of the housing and thereby it is prevented that the inside space defined by the terminal casing will be filled with the liquid-phase refrigerant within a shorter period of time.

13. An encapsulated electrically driven compressor according to claim 12, wherein the opening is formed in the terminal casing at such a position which is lower than a position of the electrically conductive terminal portions in a vertical direction and is displaced by a predetermined distance towards the inside space of the housing.

14. An encapsulated electrically driven compressor according to claim 12, wherein the connecting device further comprises an elastic member interposed between the upper portion of the terminal casing and the inside wall of the housing so that the upper portion of the terminal casing is air-tightly held in the housing.

15. An encapsulated electrically driven compressor according to claim 14, wherein the terminal casing has a circular projection on the upper portion thereof to enhance the air-tightness.

16. An encapsulated electrically driven compressor according to claim 14, wherein the connecting device further comprising O-rings provided to the pins and disposed between the terminal casing and the elastic member.

17. An encapsulated electrically driven compressor according to claim 12, wherein the opening is formed at lower side end of the terminal casing, so that the lead wires are bent by almost 90 degrees at a place close to the opening.

18. An encapsulated electrically driven compressor according to claim 12, wherein an accommodation hole is formed in the side wall of the housing and the terminal casing is held therein.

* * * * *